United States Patent
Dudziak et al.

(10) Patent No.: US 11,687,877 B2
(45) Date of Patent: *Jun. 27, 2023

(54) SYSTEMS AND METHODS FOR IDENTIFYING SUBSTITUTE GOODS

(71) Applicant: Home Depot Product Authority, LLC, Atlanta, GA (US)

(72) Inventors: William Dudziak, Marietta, GA (US); Jared T. Sears, Cumming, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/511,045

(22) Filed: Oct. 26, 2021

(65) Prior Publication Data
US 2022/0067643 A1 Mar. 3, 2022

Related U.S. Application Data

(63) Continuation of application No. 14/085,449, filed on Nov. 20, 2013, now Pat. No. 11,157,868.

(51) Int. Cl.
*G06Q 10/087* (2023.01)
*G06Q 10/02* (2012.01)

(52) U.S. Cl.
CPC .................. *G06Q 10/087* (2013.01)

(58) Field of Classification Search
CPC .................................. G06Q 10/087
USPC ........................................ 705/28
See application file for complete search history.

(56) References Cited

U.S. PATENT DOCUMENTS

| | | | |
|---|---|---|---|
| 5,794,207 A * | 8/1998 | Walker .................. | G06Q 10/02 705/77 |
| 6,885,902 B2 | 4/2005 | Crampton et al. | |
| 6,898,473 B2 | 5/2005 | Crampton et al. | |
| 7,233,914 B1 | 6/2007 | Wijaya et al. | |
| 7,370,005 B1 | 5/2008 | Ham et al. | |
| 7,668,761 B2 | 2/2010 | Jenkins et al. | |
| 7,720,720 B1 | 5/2010 | Sharma et al. | |
| 8,090,626 B1 | 1/2012 | Wijaya et al. | |
| 8,112,317 B1 | 2/2012 | Ballaro et al. | |
| 2003/0177050 A1 | 9/2003 | Crampton et al. | |
| 2005/0189415 A1 * | 9/2005 | Fano .................. | G06Q 30/0251 235/383 |
| 2008/0120129 A1 | 5/2008 | Seubert et al. | |
| 2009/0063233 A1 | 3/2009 | Kumar et al. | |
| 2010/0042516 A1 * | 2/2010 | Knipfer .................. | G06Q 10/00 705/29 |
| 2012/0095879 A1 | 4/2012 | Wijaya et al. | |

(Continued)

FOREIGN PATENT DOCUMENTS

WO 2013052081 B1 4/2013

OTHER PUBLICATIONS

Office Action Received in Canadian Counterpart Application 2,871,747, dated Dec. 30, 2020, 7 pgs.

(Continued)

*Primary Examiner* — Garcia Ade
(74) *Attorney, Agent, or Firm* — Greenberg Traurig, LLP

(57) ABSTRACT

This disclosure includes various methods and systems for automatically identifying product substitutes based on correlating product attributes to attributes of products in a subset of possible product pairs that are identified as substitute pairs.

20 Claims, 7 Drawing Sheets

(56) References Cited

U.S. PATENT DOCUMENTS

2012/0203661 A1    8/2012    Baharloo et al.
2013/0066740 A1    3/2013    Quimet et al.

OTHER PUBLICATIONS

Office Action Received in Canadian Counterpart Application 2,871,747, dated Dec. 9, 2019, received Jan. 16, 2020, 6 pgs.
Office Action Received in Mexican Counterpart Application MX/a/2014/014248 dated May 29, 2017, 6 pgs. The Office Action contains clarity objections and a novelty rejection based on U.S. Appl. No. 2008/120129, 6 pgs.
Office Action Received in Mexican Counterpart Application MX/a/2014/014248 dated Nov. 11, 2016, 8 pgs.
Translation of Office Action Received in Mexican Counterpart Application MX/a/2014/014248 dated Nov. 11, 2016, 8 pgs.
Office Action received in Canadian counterpart application No. 2,871,747 dated Nov. 28, 2016, 4 pgs.
Office Action Received in Mexican Counterpart Application MX/a/2014/014248 dated Apr. 22, 2016, 6 pgs.
Translation of Office Action Received in Mexican Counterpart Application MX/a/2014/014248 dated Apr. 22, 2016, 6 pgs.

\* cited by examiner

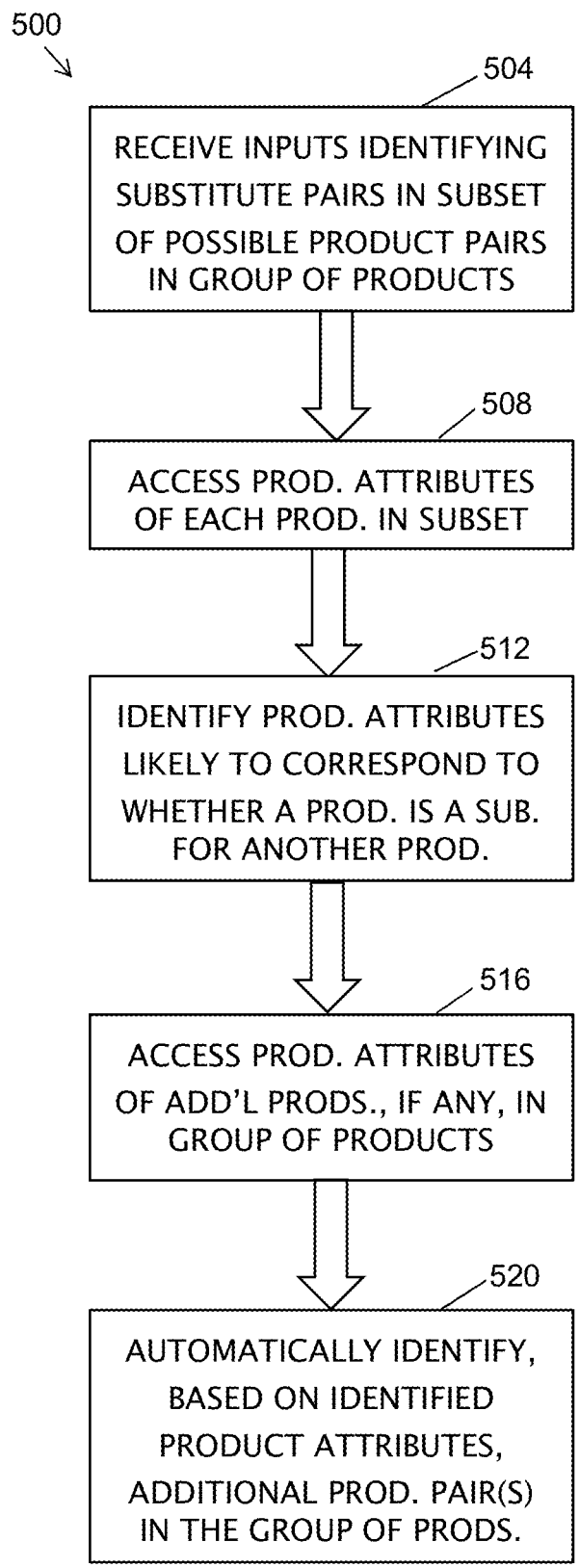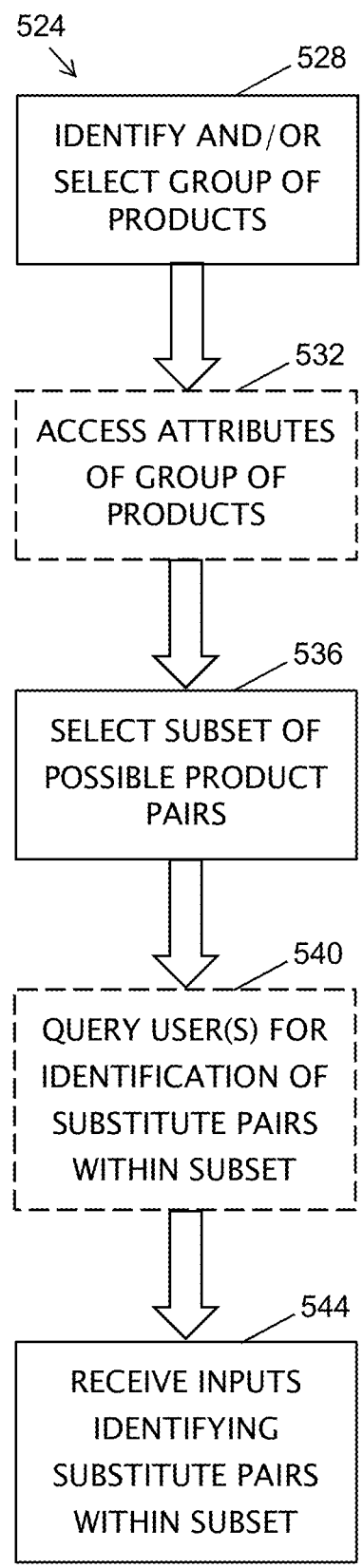
FIG. 5
FIG. 6

SYSTEMS AND METHODS FOR IDENTIFYING SUBSTITUTE GOODS

CROSS REFERENCE TO RELATED APPLICATION

This application is a continuation of and claims priority to U.S. patent application Ser. No. 14/085,449, filed on Nov. 20, 2013 and now granted as U.S. Pat. No. 11,157,868, the entire contents of which is hereby incorporated by reference.

FIELD OF INVENTION

This disclosure relates generally to optimization of product sales and, more particularly, but not by way of limitation, to methods and systems for identifying substitute products.

BACKGROUND

Two goods are generally considered to be substitutes if a consumer can purchase and/or use one good instead of the other good. One conventional way to identify a substitute is to use cross-price elasticity. Cross-price elasticity is the ratio of the percentage change in the quantity demanded of one good to the percentage change in price of another good. A substitute may be identified when the cross-price elasticity is positive and statistically significant. For example, a significant increase in a demand of a first good that is closely correlated with a significant increase in price of a second good can indicate a high cross-price elasticity, and that the first good is a substitute for the second good.

Another conventional way to identify a substitute is by investigating a stockout. When a primary good is out-of-stock, an increase in sales in an alternative good during the stockout may indicate that the alternative good is a substitute for the primary good. However, where a supply chain is orchestrated to avoid stockouts, such stockout data may not be available to a degree that is sufficient to identify substitute goods with regularity or accuracy.

There are also manual ways to identify substitutes. For example, individuals who are experts on their product areas can manually identify substitutes for each product. Such a process, however, is generally not scalable for hundreds of thousands of stock keeping units (SKUs).

SUMMARY

This disclosure includes embodiments of systems and methods for identifying substitute goods (e.g., substitute pairs of goods) in a scalable manner. In some embodiments, a matrix of SKUs is created, where each SKU is associated with a database record corresponding to or associated with the product and one or more product attributes. For example, where a group of products includes 300 SKUs, a matrix can be generated with 300 rows and 300 columns, each corresponding to the same list of SKUs. Each row/column SKU pair represents a product pair that may or may not be substitutes. Whether a product pair is a substitute pair can be indicated by a binary value ("1" or "yes," or "0" or "no"). Such a matrix of 300 rows and 300 columns results in 90,000 possible pairings. Even excluding the pairings of the same products and duplicate SKU combinations (e.g., where two-way substitution is assumed for each substitute pair), there are still 44,850 possible product pairs. It is impracticable to require a user to review such a large number of possible product pairs to identify any substitute pairs. However, a subset of the possible product pairs can be identified with a representative sampling of product attributes included in the larger group of 300 products and/or that is weighted to include the highest-selling ones of the 300 products (e.g., to ensure better representation for the products that are most likely to sell out or be subject to price fluctuation or adjustments). For example, a subset can include 900 of the possible product pairs and can enable a user to identify which of the subset of product pairs is a substitute pair. The subset can, for example, be generated or identified based on analytical sales data (e.g., seasonality or seasonal sales volumes, weekend:weekday sales or the ratio of sales during weekends relative to sales during week days, sales velocity or rate, and/or the like) to ensure that the subset includes a broad cross-section of products as well as relatively more higher-selling products.

These user-defined substitute pairs can then be used as a reference dataset, with or without additional data such as analytical sales data (e.g., seasonality or seasonal sales volumes, weekend-weekday sales or the ratio of sales during weekends relative to sales during week days, sales velocity or rate, and/or the like), from which a model can be generated. For example, the user inputs for the subset of product pairs can be received and analyzed in combination with each product's product attributes (product attributes associated with the product) to identify which product attributes are most likely to correlate to whether a product is a substitute for another product, and a model can be generated based on the identified product attributes that correlate to the user-defined substitution pairs. The model can then be applied to the broader set of possible product pairs to systematically and automatically identify additional substitute pairs. The model can also be tested and/or refined by applying the model to the subset of possible product pairs, and comparing the results to the user-defined relationships to identify errors in the model.

Some embodiments of the present computerized methods (e.g., of identifying substitute pairs in a group of products in which each product associated with product attributes) comprise: receiving a plurality of inputs indicative of whether each of a subset of possible product pairs in the group of products is a substitute pair, where each substitute pair includes a first product and a second product that is a substitute for the first product; electronically accessing the product attributes associated with each of the products in the subset; automatically identifying one or more of the product attributes that are most likely to correspond to whether a product is a substitute for another product; electronically accessing the product attributes associated with additional products in the group of products; and automatically identifying, based on the identified product attributes, one or more additional substitute pairs in the group of products. In some embodiments, the subset of possible product pairs includes products having a majority of all product attributes associated with the products in the group of products. In some embodiments, the subset of possible product pairs includes products having sales volumes that are higher than sales volumes of other products in the group of products.

Some embodiments further comprise: automatically selecting the subset of possible product pairs. In some embodiments, the subset of possible product pairs is selected to include at least one of: products having a majority of all product attributes associated with the products in the group of products; and products having sales volumes that are higher than sales volumes of other products in the group of products. In some embodiments, the product attributes are hierarchically organized into levels. In some embodiments, automatically identifying product attributes comprises automatically identifying the hierarchical level of product attributes that are most likely to correspond to whether a product is a substitute for another product. In some embodiments, automatically identifying product attributes comprises: identifying one or more product attributes that, if associated with each of two products, are most likely to indicate that the two products are a substitute pair.

In some embodiments, automatically identifying product attributes comprises: developing a model, based on the identified product attributes, indicative of which possible product pairs in the group of products are most likely to be substitute pairs. In some embodiments, the identified attributes comprise sales data that includes at least one of seasonal sales volume, weekend to weekday sales ratio, and sales frequency. Some embodiments further comprise: applying the model to the subset of possible product pairs to generate indications of which of the subset of possible product pairs are substitute pairs; comparing the indications to the inputs to identify errors in the indications; and modifying the model if the comparison identifies errors. Some embodiments further comprise: varying the model to generate one or more modified models; and performing f-test comparisons of the model and the one or more modified models relative to the inputs to identify one of the model and the one or more modified models that most closely corresponds to the inputs when applied to the subset of possible product pairs. In some embodiments, modifying the model comprises eliminating from the model one or more of the identified product attributes.

In some embodiments, automatically identifying product attributes comprises: identifying one or more product attributes that, if not associated with each of two products, are most likely to indicate that the two products are not a substitute pair. In some embodiments, the plurality of inputs are manually entered by a user.

Some embodiments of the present systems comprise: a memory configured to store data indicative of a plurality of product attributes associated with a plurality of products; and a processor coupled to the memory, the processor configured to: receive a plurality of inputs indicative of a first set of substitute pairs within a subset of the plurality of products; identify, based on the product attributes associated with the first set of substitute pairs, one or more of the product attributes that are most likely to correspond to whether a product is a substitute for another product; and identify, based on the identified product attributes, additional substitute pairs within the plurality of products. In some embodiments, the processor is further configured to develop a model, based on the identified attributes, indicative of which of the product attributes are most likely to correspond to whether a product is a substitute for another product; and the memory is further configured to store the model. In some embodiments, the identified product attributes comprise sales data that includes at least one of seasonal sales volume, weekend to weekday sales ratio, and sales frequency. In some embodiments, the processor is further configured to: apply the model to the first subset of possible product pairs to generate indications of which of the subset of possible product pairs are substitute pairs; comparing the indications to the inputs to identify errors in the indications; and modifying the model if the comparison identifies errors. In some embodiments, the processor is further configured to vary the model to generate one or more modified models; and performing f-test comparisons of the model and the one or more modified models relative to the inputs to identify one of the model and the one or more modified models that most closely corresponds to the inputs when applied to the subset of possible product pairs.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 5 depicts a flow chart of one of the present methods of identifying product substitute pairs in a group of products.

FIG. 6 depicts a flow chart of one of the present methods of selecting a subset of possible product pairs in a group of products, such as for manual identification of substitute pairs within the subset.

DESCRIPTION OF ILLUSTRATIVE EMBODIMENTS

Figure 1:
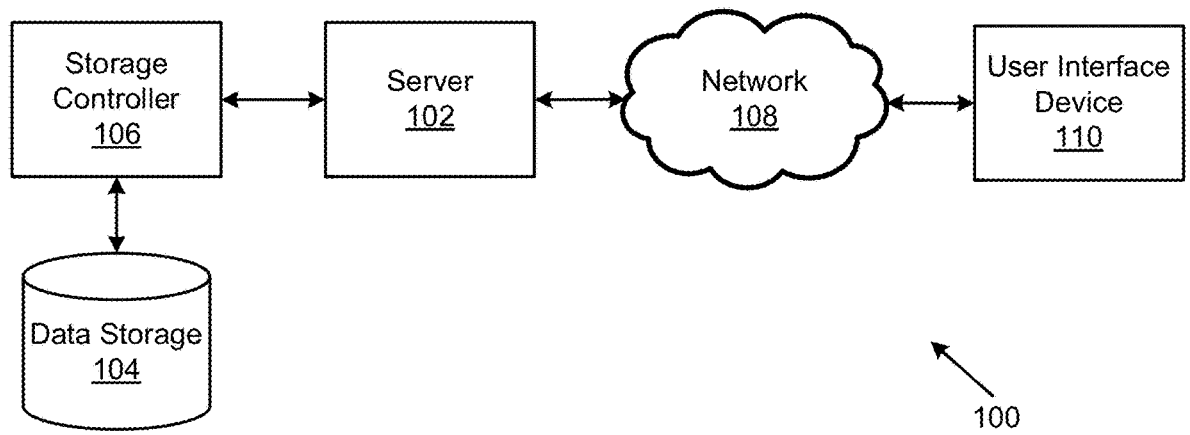
FIG. 1 is a schematic block diagram illustrating one of the present systems.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module comprises a machine- or machines-executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions that may be organized as an object, procedure, or function. Nevertheless, the executables of an identified module need not be physically located together, but may comprise disparate instructions stored in different locations that, when joined logically together, comprise the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system 100 for identifying substitute goods or products within a group of products. System 100 may include a server 102, a data storage device 104, a network 108, and a user interface device 110. In some embodiments, server 102 may include storage device 104 (e.g., a server housing or enclosure may house storage device 104). In some embodiments, system 100 may include a storage controller 106, and/or a storage server configured to manage data communications between data storage device 104 and server 102 and/or other components in communication with network 108. In some embodiments, storage controller 106 may be coupled to network 108 (e.g., such that server 102 communicates or is configured to communicate with storage controller 106 and/or storage device 104 via network 108). In a general embodiment, system 100 may be configured to store data (e.g., types, sub-types, or other attributes of products) from which substitutes for products within a group of products can be identified. In some embodiments, system 100 is configured to permit multiple uses and/or functions to or with the data from which substitutes for products within a group of products can be identified. For example, in some embodiments, system 100 is configured to receive from a user identifications of substitute pairs in possible product pairs in a subset of the group of products, identify product attributes associated with products in the subset that are likely to correspond to whether a product is a substitute for another product, access product attributes associated with additional products within the group of products, and automatically identify, based on identified product attributes, additional product pairs in the group of products.

In some embodiments, server 102 is configured to access data stored in data storage device(s) 104 via a Storage Area Network (SAN) connection, a LAN, a data bus, or the like. Data storage device 104 may include a hard disk, including hard disks arranged in an Redundant Array of Independent Disks (RAID) array, a tape storage drive comprising a magnetic tape data storage device, an optical storage device, or the like. In one embodiment, data storage device 104 stores product data including, for example, custom data, as described in more detail below. In some embodiments, server 102 and/or storage device(s) 104 are configured to create a back-up (full and/or partial back-up) of the data of system 100, such as, for example, periodically and/or responsive to an instruction from a system administrator to back-up data on the system.

In some embodiments, user-interface device 110 is referred to broadly and comprises a suitable processor-based device such as, for example, a desktop computer, a laptop computer, a Personal Digital Assistant (PDA), and/or a mobile communication or organizer device (e.g., a cellular phone, smartphone, etc.) having access to the network 108. In some embodiments, user interface device 110 can be configured to access the Internet to access a web application or web service hosted by server 102 and thereby provide a user interface for enabling a user to enter or receive information (e.g., from server 102). For example, a user may receive or view, via user interface device 110, a webpage including a group of products, a subset of a group of products, and/or a subset of possible product pairs in the group of products. By way of further example, in some embodiments, user interface device 110 can be configured to receive from a user (e.g., via user-input device, such as a keyboard, mouse, touchscreen, and/or the like), can be configured to prompt a user for (e.g., server 102 can be configured to instruct user-interface device 110 to prompt a user for), and/or can be configured to transmit to server 102 (e.g., via network 108), user inputs indicative of whether possible product pairs within a group of products are substitute pairs (i.e., whether one product in a pair is a substitute for the other product in the pair).

Network 108 may facilitate communications of data between server 102 and user interface device 110. Network 108 may include any type of communications network including, but not limited to, a direct PC to PC connection, a local area network (LAN), a wide area network (WAN), a modem to modem connection, the Internet, a combination of the above, or any other communications network now known or later developed within the networking arts which permits two or more computers to communicate, one with another.

In some embodiments, system 100 comprises: one or more electronic storage devices 104 configured to, for a plurality of SKUs or products: store product data or attributes from which substitute pairs can be identified, such as, for example, product type (e.g., hammers, hatchets, mallets), sub-type (e.g., tack hammer, claw hammer, framing hammer, sledge hammer, and/or the like), product attributes (e.g., head weight), and/or the like that are associated with one or more products in a group of products such that at least one of the one or more products can be identified as a substitute for one or more other products based on similarities and/or dissimilarities of attributes. For example, in some embodiments, server 100 can be configured to permit a user to enter inputs (e.g., manually via a user interface device 110) to manually identify substitute pairs within a subset of possible product pairs (e.g., such that one or more electronic storage devices 104 can store the manually identified substitute pairs) and automatically identify additional substitute pairs within the larger group of possible product pairs. For example, as in the embodiments described below, system 100 can identify product attributes that are likely to correspond to whether a product is a substitute for another product and, based on similarities and/or dissimilarities of corresponding product attributes of additional products, identify additional substitute pairs within the particular group of products.

Figure 2:
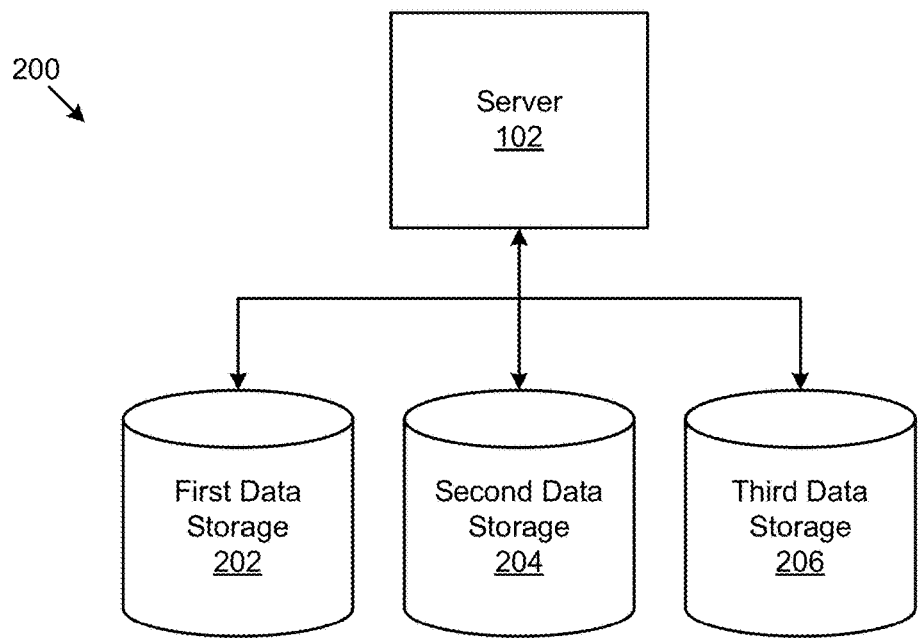
FIG. 2 is a schematic block diagram illustrating a database suitable for use in some of the present systems.

FIG. 2 illustrates one embodiment of a data management system 200 configured to store and manage data for identifying substitutes for products within a group of products. In one embodiment, the system 200 may include a server 102. The server 102 may be coupled to a data-bus that may, for example, communicate with one or more data storage devices. In one embodiment, the system 200 may also include a first data storage device 202, a second data storage device 204 and/or a third data storage device 206. In further embodiments, the system 200 may include additional data storage devices (not shown). In such an embodiment, each data storage device 202-206 may host a separate database of products including, for example, product type (e.g., hammer), sub-type (e.g., tack), product attributes (e.g., head weight), and/or other data related to the product(s). In some embodiments, each of storage devices 202-206 can store or be configured to store data associated with a different classes of products or subsets of product-related data (e.g., storage device 202 storing data associated with a first class of products (e.g., tools), storage device 204 storing data for a second class of products (e.g., hardware), storage device 206 storing data for a third class of products (e.g., fixtures), etc.; or, storage device 202 storing a first type of data, such as SKUs associated with all products, storage device 204 storing data associated with or indicative of product attributes for the product SKUs stored in storage device 202, storage device 206 storing data associated with product substitute pairs), etc. In some embodiments, storage devices 202-206 may be arranged in a RAID configuration for storing redundant copies of a database or databases (e.g., through synchronous or asynchronous redundancy updates).

In various embodiments, server 102 may communicate with data storage devices 204-210 over a data-bus (illustrated by arrows between server 102 and storage devices 202-206). In such embodiments, the data-bus may comprise a SAN, a LAN, or the like. The communication infrastructure may include Ethernet, Fibre-Channel Arbitrated Loop (FC-AL), Small Computer System Interface (SCSI), and/or other similar data communication schemes associated with data storage and communication. For example, server 102 may communicate indirectly with data storage devices 202-206, (e.g., via a storage server or storage controller 106).

Server 102 may host one or more software applications (e.g., web- and/or Internet-accessible software applications) configured for (e.g., network-based) access to and/or modification of the data and/or executables (e.g., for implementing the methods) described in this disclosure. The software application may further include modules configured to interface with data storage devices 202-206, network 108, a user (e.g., via a user-interface device 110), and/or the like. In a further embodiment, server 102 may host an engine, application plug-in, or application programming interface (API). In another embodiment, server 102 may host a web service and/or other web accessible software application.

Figure 3:
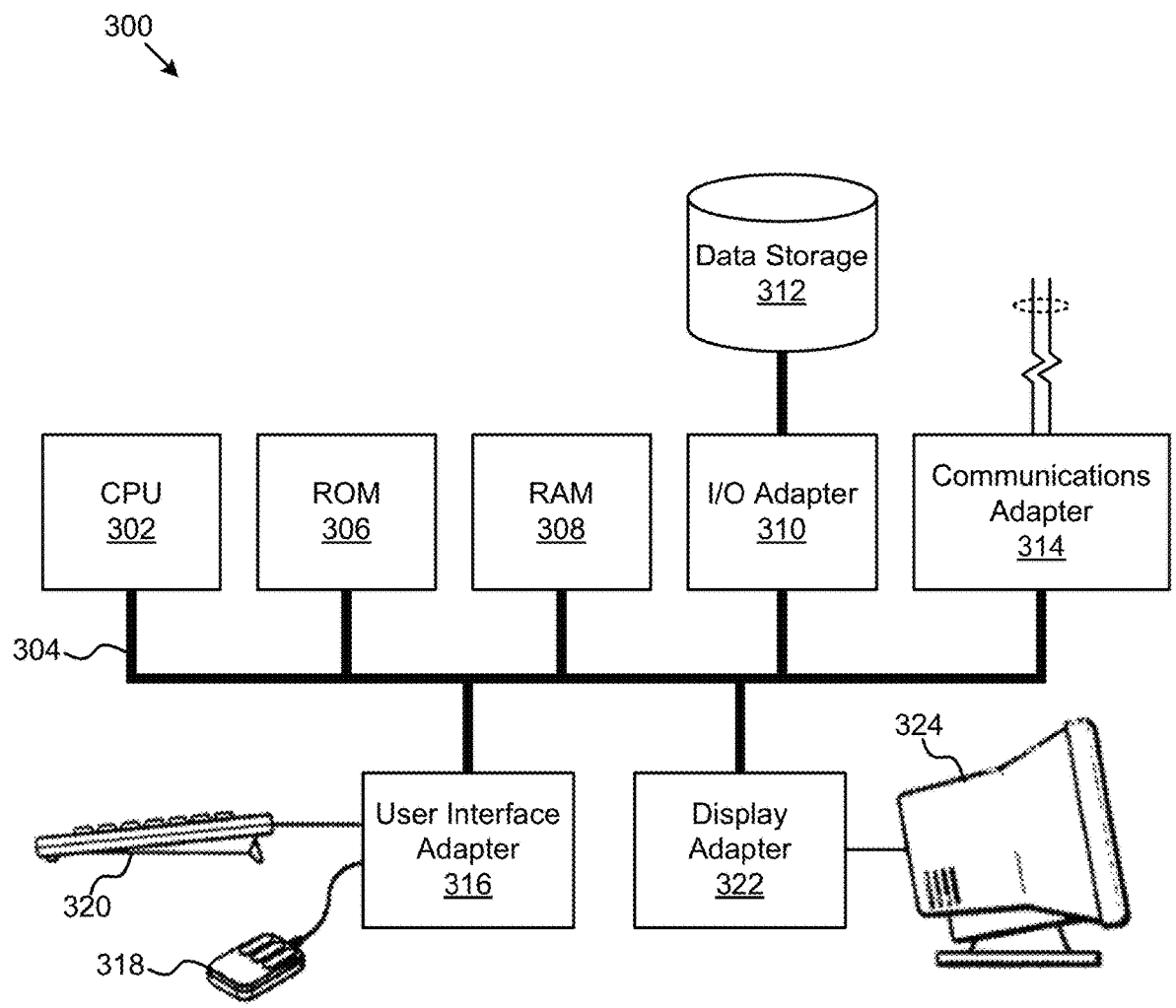
FIG. 3 is a schematic block diagram illustrating one embodiment of a computer suitable for use with or in at least some of the present systems.

FIG. 3 illustrates a computer system 300 adapted according to certain embodiments of server 102 and/or user interface device 110. Central processing unit (CPU) 302 is coupled to system bus 304. CPU 302 may be a general purpose CPU or microprocessor. The present embodiments are not restricted by the architecture of CPU 302, as long as CPU 302 supports the modules, configurations, and/or operations as described herein. CPU 302 may execute the various logical instructions according to the present embodiments. For example, CPU 302 may execute machine-level instructions according to the exemplary operations described below.

Computer system 300 also may include Random Access Memory (RAM) 308, which may be SRAM, DRAM, SDRAM, or the like. Computer system 300 may utilize RAM 308 to store the various data structures used by a software application configured for identifying substitutes for products within a group of products. Computer system 300 may also include Read Only Memory (ROM) 306 which may be PROM, EPROM, EEPROM, optical storage, or the like. ROM 306 may store configuration information for booting computer system 300. RAM 308 and ROM 306 may also store user and/or system 100 data.

Computer system 300 may also include an input/output (I/O) adapter 310, a communications adapter 314, a user interface adapter 316, and a display adapter 322. I/O adapter 310, communications adapter 314, and/or user interface adapter 316 may, in some embodiments, enable or a user to interact with computer system 300 (e.g., to input information for example, to access, identify, and/or modify data associated with or indicative of substitute pairs. In a further embodiment, display adapter 322 may display a graphical user interface associated with a software or web-based application for accessing the system and/or implementing the methods described in this disclosure.

I/O adapter 310 may connect to one or more storage devices 312, such as one or more of a hard drive, a Compact Disk (CD) drive, a floppy disk drive, a tape drive, to the computer system 300. Communications adapter 314 may be adapted to couple computer system 300 to network 108, which may, for example, be one or more of a LAN, WAN, and/or the Internet. User interface adapter 316 couples user input devices, such as a keyboard 320 and a pointing device 318, to computer system 300. Display adapter 322 may be driven by CPU 302 to control the display on display device 324.

The present embodiments are not limited to the architecture of system 300. Rather computer system 300 is provided as an example of one type of computing device that may be adapted to perform the functions of a server 102 and/or user interface device 110. For example, any suitable processor-based device may be utilized including without limitation, personal data assistants (PDAs), computer game consoles, smart phones, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 4:
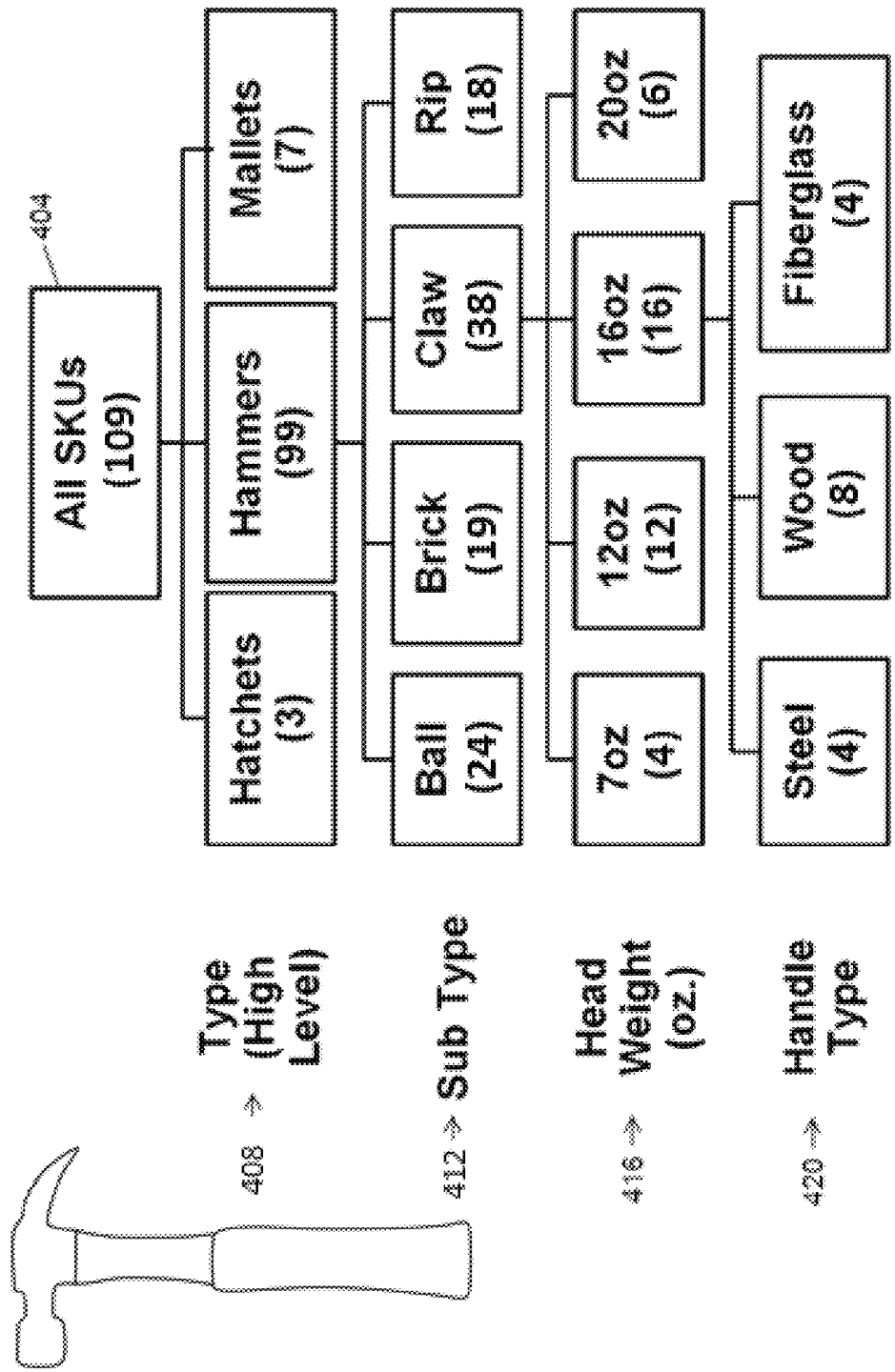
FIG. 4 depicts a hierarchical block diagram illustrating various hierarchical levels of product attributes associated with products in a hammer product type or class.

FIG. 4 depicts a hierarchical block diagram illustrating various hierarchical levels of product attributes associated with products in a hammer product type, which may, for example, be of a larger "hand tool" subclass and/or "tool" class. It should be understood that FIG. 4 depicts examples of product types and characteristics, however, any product types, characteristics, and/or attributes that permit the functionality described in this disclosure may be used by the present systems and methods. In some embodiments, the hierarchical levels may include a set 404 of products (e.g., 109 products). In the embodiment shown, the hierarchical levels include a product type 408, which may, for example include possible values of: hatchet, hammer, and/or mallet. The hierarchical levels may also include a sub-type 412, which, in the hammer type 408, can include possible values of: ball hammer, brick hammer, claw hammer, and/or rip hammer. In the embodiment shown, another hierarchical level includes more specific product attributes such as a head weight 416 of a hammer, and may include values such as: 7 ounces (oz.), 12 oz., 16 oz., and/or 20 oz. In the embodiment shown, an additional hierarchical level includes other specific product attributes such as a handle type 420, which may include values such as: steel, wood, and/or fiberglass.

In various embodiments, products can be organized and/or arranged into hierarchical levels by types, subtypes, and/or various other product attributes. For example, a "tool" class of products can include subclasses for power tools and hand tools, hand tools may include types for saws, screwdrivers, hammers, and/or the like, and the products may further include various attributes (e.g., as described above for hammers). By way of further example, a "fixture" class of products can include subclasses for light fixtures and plumbing fixtures, plumbing fixtures may include sub-subclasses for sink faucets, tub faucets, shower heads, and/or the like, and the products may be associated with one or more product attributes (e.g., finish, dimensions, and/or the like). Any of various databases types and/or configurations may be used to organize and/or access these types of data. For example, a database may include numerous records, each of which includes a stock keeping unit (SKU) for a single product, as well as various fields noting one or more classes, subclasses, sub-subclasses, and/or attributes associated with the SKU and/or with which the SKU can be categorized. The product types and characteristics are conceptually depicted as hierarchical, but it should be understood that the consideration or evaluation of various characteristics and relationships is not necessarily linear and does not necessarily proceed strictly from highest to lowest hierarchical level. Rather, the consideration or evaluation of various characteristics can proceed simultaneously, from lower to higher levels, and/or from higher to lower levels.

In some embodiments, possible product pairs can be identified (and/or a list generated) by forming a matrix. For example, in the embodiment shown, with 109 products in set 404 a 109-row by 109-column matrix can be formed generating 11,881 product pairs (or 5,886 pairs when the pairs representing two of the same product or duplicate combinations are eliminated). Increases in the size of a set or group of product can drastically increase the number of possible product pairs.

FIG. 5 depicts a flow chart of one of the present methods of identifying product substitute pairs in a group of products. In the embodiment shown, method 500 comprises a step 504 of receiving (e.g., with a user interface device 110 and/or a server 102 that is configured to communicate with one or more electronic storage devices 104 or one or more user interface devices 110) a plurality of inputs identifying substitute pairs in a subset of possible product pairs (in a group of products). Inputs can include, but are not limited to, manual entries in a file (e.g., a spreadsheet) to indicate that certain of the subset of possible product pairs are substitute pairs. As used in this disclosure, a "substitute pair" includes a first product and a second product that is a substitute for the first product. For the purposes of the depicted embodiments, substitute pairs may be assumed to be bilateral such that either product is a substitute for the other product. In the example shown, method 500 comprises a step 508 of accessing product attributes of each product in the subset of possible product pairs (e.g., accessing from one or more electronic storage devices 104). In some embodiments, product attributes may include head weight 416 and/or head type, as described with reference to FIG. 4. In the embodiment shown, method 500 comprises a step 512 of identifying, based on the subset of possible product pairs for which inputs were received, product attributes that are most likely to correspond to whether a product is a substitute for another product, as described in further detail below. In the embodiment shown, method 500 further comprises a step 516 of accessing product attributes of additional products, if any, in the product group (from which the larger set of possible product pairs is generated). In the embodiment shown, method 500 comprises automatically identifying, based on the product attributes identified in step 512, one or more additional substitute pairs in the group of products.

FIG. 6 depicts a flow chart of a method 524 of selecting a subset of possible product pairs in a group of products, such as for manual identification of substitute pairs. In the embodiment shown, method 524 includes receiving a plurality of inputs for step 504 of method 500 in FIG. 5. In this embodiment, method 524 comprises a step 528 of identifying a group of products, which may include one or more sets of products (e.g., 404), various types (e.g., 408), sub-types (e.g., 412), and/or other product attributes (e.g., 416, 420). In the embodiment shown, method 524 comprises a step 532 of accessing product attributes for the group of products (e.g., accessing from one or more electronic storage devices 104, 202-206, and/or the like). In some embodiments, product attributes may not initially be stored locally and may be imported (e.g., manually via a user interface device 110 and/or automatically), such as, for example, from a remote database. In the embodiment shown, method 524 comprises a step 536 of automatically selecting a subset of possible product pairs (e.g., a 5% randomized sample of a matrix of product pairs or a subset of 294 product pairs of an available 5,886 possible product pairs for set 404). In some embodiments, the subset of possible product pairs includes products having a majority of all product attributes in the group of products (e.g., for set 404 of hammers, having a majority of possible values for: handle type 420, head weight 416, sub-type 412, and/or type 408).

In some embodiments, the subset of possible product pairs is weighted towards inclusion of the highest-selling products in the group (e.g., includes products having sales volumes that are higher than sales volumes of other products in the group of products). For example, the subset can be generated or identified based on analytical sales data (e.g., seasonality or seasonal sales volumes, weekend:weekday sales or the ratio of sales during weekends relative to sales during week days, sales velocity or rate, and/or the like) to ensure that the subset includes a broad cross-section of products as well as relatively more higher-selling products. In the embodiment shown, method 524 comprises an optional step 540 of prompting a user (e.g., via a user interface device 110) to identify substitute pairs within the subset of possible product pairs. For example, a user may identify within the subset (sample of the overall product matrix) substitute pairs with a "1" or "yes" and product pairs that are not substitutes with a "0" or "no." In the embodiment shown, method 524 comprises a step 544 of receiving (e.g., with a server 102) inputs (e.g., from a user-interface device 110) identifying substitute pairs within the subset of possible product pairs. In some embodiments, prompting 540 is omitted and a user automatically identifies substitute pairs within the subset at their own initiative.

Figure 7:
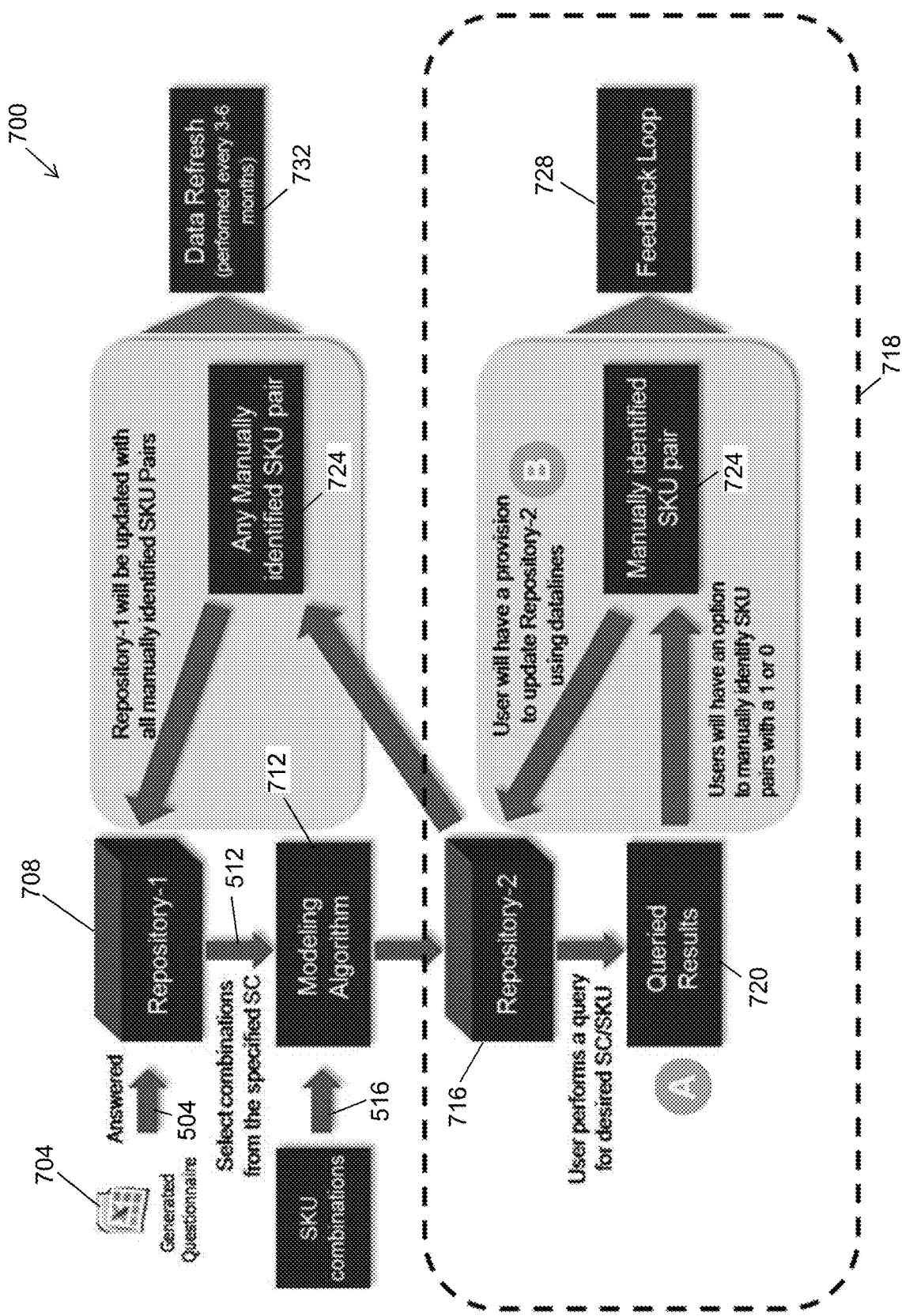
FIG. 7 depicts a detailed flow chart of one exemplary implementation of the method of FIG. 5.

FIG. 7 depicts a detailed flow chart of one exemplary implementation 700 of the method of FIG. 5. In the embodiment shown, method 700 comprises receiving a subset 704 of user-identified substitute pairs in a repository 708 (e.g., an electronic storage device 104), which receiving may generally correspond to step 504 of FIG. 5. For example, in most embodiments, subset 704 can be a subset of possible product pairs in a group of products, as described above. In the embodiment shown, subset 704 takes the form of a spreadsheet having user-defined indications of whether each possible product pair in the subset of possible product pairs is a substitute pair. In other embodiments, subset 704 can take any suitable form (e.g., a tab-delimited text file, responses to individual queries presented one at a time to a user, and/or the like). In the embodiment shown, method 700 comprises a step accessing via a processor subset 704 from repository 708 and developing and/or adjusting a model 712 that is configured to identify which product attributes of the products in subset 704 correspond to whether a product is a substitute for another product, which identifying may generally correspond to step 512 of FIG. 5. In some embodiments, model 712 identifies product attribute values (e.g., claw hammer) as corresponding to whether a product is a substitute for another product. In some embodiments, model 712 alternatively or additionally identifies product attribute hierarchy levels (e.g., sub-type) as corresponding to whether a product is a substitute for another product. For example, referring to FIG. 4, if two hammers have a sub-type 412 value of "claw" and are identified as substitutes, model 712 can identify the hierarchy level corresponding to sub-type 412 as a level in which matching product attributes is indicative of one product being a substitute for another product. In some embodiments, model 712 can also identify that two products are likely not to be a substitute pair because they do not include a matching attribute (e.g., in a hierarchical level that is identified as correlating to whether two products are a substitute pair). For example, developing or improving model 712 can include the following steps:

identify product attributes of products in product pairs of subset 704;

identify product attributes shared by substitute pairs in subset 704;

determine likelihood of shared product attributes correlating to whether a product pair is a substitute pair;

determine likelihood of hierarchical levels of product type, subtype, and/or other attributes correlating to whether a product pair is a substitute pair;

identify relative weights (e.g., weighting constants) for identified attributes and/or hierarchical levels according to determined likelihoods for shared attributes and/or hierarchical levels correlating to substitute pairs;

apply identified variables and/or hierarchical levels, and corresponding relative weights to formula, $P=1/(1+e^{\wedge}(-(\beta_1 X_1 + \beta_2 X_2 + \beta_3 X_3 + \ldots)))$, where $X_1$, $X_2$, and $X_3$ represent variables (attributes, hierarchical levels, or sales analytics) and $\beta_1$, $\beta_2$, and $\beta_3$ represent weighting constants for each corresponding variable; and identify probability, P, threshold for automatic identification of product pair as a substitute pair, such as, for example, by comparison of model 712 to manually identified substitute pairs in subset 704 and identification of a threshold P value (e.g., 0.75) above which false positives and false negatives are minimized.

Various implementations of the present methods may include all or only some of the foregoing substeps or elements, and/or may include additional substeps or elements, for development of the model. In addition to the product attributes and characteristics discussed above, the model can also consider similarities in analytical sales data (e.g., seasonality or seasonal sales volumes, weekend:weekday sales or the ratio of sales during weekends relative to sales during week days, sales velocity or rate, and/or the like) between products as an indicator of whether two products are a substitute pair. For example, if two products share similar seasonality attributes, one is more likely to be a substitute for the other.

In some embodiments, method 700 comprises refining model 712 by applying the model to the possible product pairs of subset 704 and assessing whether the output of model 712 approximates the user inputs of subset 704 to identify any errors in the output of the model relative to the user-defined substitute pairs in subset 704. For example, model 712 may be required to match user input set 704 to a certain degree (e.g., 80%, 90%, or more). In some embodiments, model 712 can be modified to obtain more accurate modified models, such as by adding and/or removing variables (e.g., attributes and/or attribute levels that are compared between product pairs to automatically identify substitute pairs). For example, model 712 may be further refined by performing an F-Test of the model and any such modified models relative to the user input set 704, such as, for example, to identify variables to which precision is particularly sensitive to remove unnecessary variables from the model and/or identify which variables should be weighted to a lesser degree. For example, if model 712 involves three variables X, Y, and Z (each corresponding to different product attributes or hierarchical levels of product attributes), variations of model 712 can be applied to the product pairs of subset 704 using combinations of the product attributes that omit one variable (e.g., XY, XZ, YZ) to determine whether one product attribute can be removed from the model or given less weight without sacrificing accuracy, and to obtain the model that most closely resembles the user input set 704 when applied to a subset of product pairs.

In the embodiment shown, after model 712 is developed, additional possible product pairs not included in subset 704 and corresponding product attributes are accessed, which accessing generally corresponds to step 516 of FIG. 5. For example, where only 5% of possible product pairs are included in subset 704, the remaining 95% of possible product pairs and the product attributes of the corresponding products can be accessed to enable application of model 712 to the broader set of data to automatically identify additional substitute pairs within the overall group of possible product pairs. In the embodiment shown, data indicating which of the possible product pairs are substitute pairs (the combination of subset 704, which are generally not changed by application of model 712, and the output of the application of model 712 to the remaining possible product pairs) is stored in repository 716 directly accessible within a user environment 718 (e.g., via a user-interface device 110). Repository 716 may be unitary with repository 712 or may be in a physically separate storage device; the separate depiction of repository 716 relative to repository 712 is indicative that, in at least the depicted embodiment, the system is maintained so as to be able to identify substitute pairs that are manually identified and substitute pairs that are automatically identified. In this way, the system is able to reference manually identified substitute pairs (which may be added to from time-to-time, as described below) as a baseline data set from which model 712 can be improved. In other embodiments, results of applying model 712 do not need to be stored in repository 716, and model 712 can instead be run in real time at any point in time (e.g., for relatively smaller groups of products).

In the embodiment shown, method 700 comprises performing a query 720 of the overall dataset that includes the results of applying model 712 (e.g., a user can manual examine the results via a user interface device 110). For example, a user can run a query 720 for a specific product and the system can return a response (e.g., via a user interface device 110) indicating any products that are members of substitute pairs that include the queried product (e.g., that are substitutes for the queried product or for which the queried product is a substitute). In the embodiment shown, if a user disagrees with substitute pair identification in a response to a query 720, the user can change the relationships (e.g., change value from "1" or "yes" to "0" or "no") between two products. Similarly, in the embodiment shown, a user can identify additional pairs 724 (e.g., manually via a user interface device 110) to further refine the results. For example, if a user knows of a product that is a substitute for the queried product, the user can identify that substitute as such with a "1" or "yes" designation. These types of user-defined changes may also initiate a feedback loop 728 that may, for example, prompt the user to review additional relationships between substitute pairs that may be affected by the user-defined changes (e.g., additional substitute pairs that share common attributes with the products in the product pair whose relationship was changed by the user). In the embodiment shown, additional manually entered inputs indicating additional substitute pairs 724, or removing indication of (e.g., automatically identified) substitute pairs, are stored with results in repository 716, and are also stored with the other manual inputs in repository 708 such that all manual or user-defined inputs are maintained together or can otherwise be later identified as a reference data set that can be used to refine model 712 in further iterations 732 of the method to improve model 712 (e.g., every 3 to 6 months).

Figure 8:
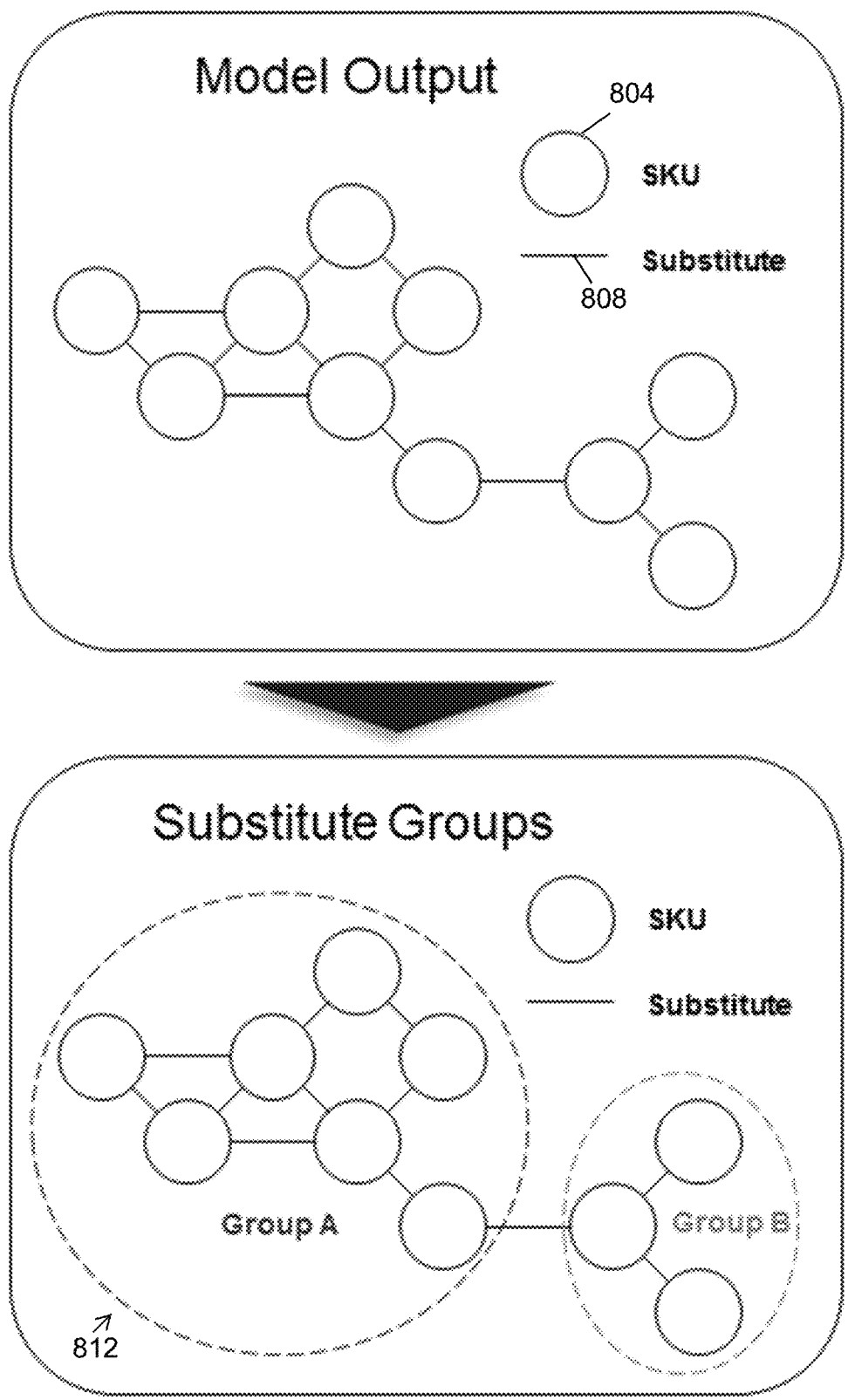
FIG. 8 depicts conceptual block diagrams of an output of the method of FIG. 7 in which substitute pairs and groups of substitute pairs are identified.

FIG. 8 depicts conceptual block diagrams of an output of the method of FIG. 7 in which substitute pairs and groups of substitute pairs are identified. The embodiment shown includes a plurality of circles 804 and a plurality of lines 808. The circles 804 represent individual products or SKUs within a group of products and lines 808 indicate that circles 804 connected by a line 808 are a substitute pair. As shown in FIG. 8, a product may have multiple substitutes or only one substitute. In some embodiments, products within a group of products may have multiple substitutes and may be categorized into groups 812 of substitutes. In some embodiments groups 812 of substitutes may be formed when one product has a plurality of substitutes (e.g., Group B shown in FIG. 8). For example, a 12-ounce wooden claw hammer and a 20-ounce wooden claw hammer may each be substitutes for a 16-ounce wooden claw hammer, but a 12-ounce wooden claw hammer may not be a substitute for a 20-ounce wooden claw hammer. In some embodiments, groups 812 may be formed by multiple products each having a plurality of substitutes (e.g., Group A shown in FIG. 8). For example, a brick hammer, claw hammer, and rip hammer (e.g., with the same head weight) might all be substitutes.

Figure 9:
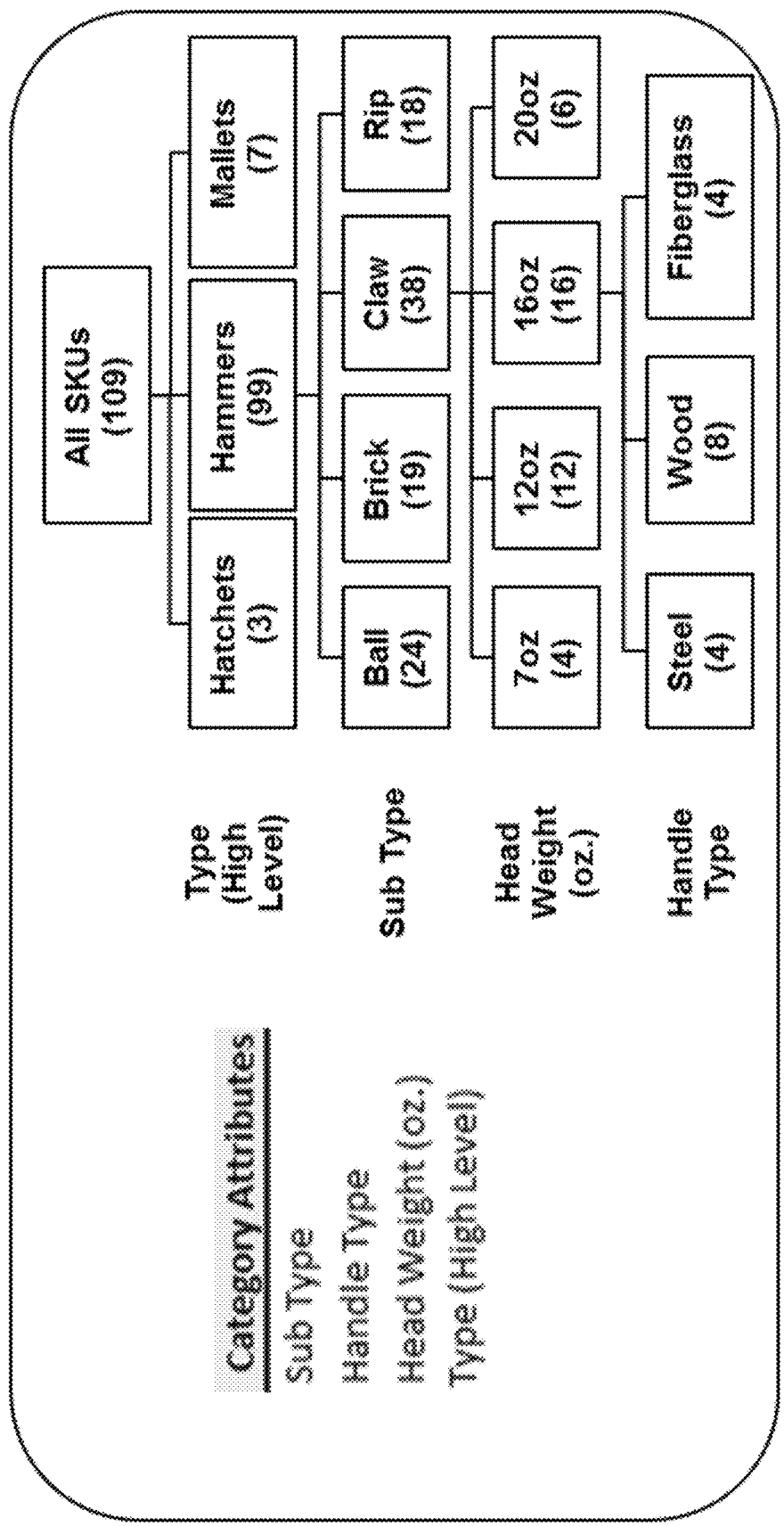
FIG. 9 depicts the ranking of hierarchical levels of attributes of FIG. 4 based on an implementation of the method of FIG. 7.

FIG. 9 depicts the ranking of hierarchical levels of attributes of FIG. 4 based on an implementation of the method of FIG. 7. The embodiment shown depicts a set 404 of products that includes varying hierarchical levels. As described above with reference to FIG. 4, set 404 is organized into type 408, which can be organized by sub-type 412, which can be further organized by sub categories, for example head weight 416 and handle type 420. In some embodiments, method 700 comprises identifying product attributes likely to correspond to whether a product is a substitute for another product, which may also generally correspond to step 508 of FIG. 5. As noted above, method 700 can comprise identifying a hierarchical level of product attributes most likely to correlate to whether a product pair is a substitute pair (e.g., type 408, sub-type 412, head weight 416, and/or handle type 420). For example, in the embodiment of FIG. 7, method 700 includes identifying hierarchical levels, which are, for example, ordered from those that are most likely to correspond for substitute products to those least likely to correspond for substitute products. In the implementation shown in FIG. 9, for example, matching sub-types are more likely to correspond to two products being substitutes than matching handle type, and matching product type is least likely to correspond to products being substitutes (e.g., based on the ordering of the category attributes shown).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, steps and/or modules may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A computerized method of identifying substitute pairs in a group of products, each product associated with product attributes, the method comprising:
   identifying, by a processor, one or more product attributes of a plurality of product attributes that are most likely to correspond to whether a product is a substitute for another product, wherein:
      the one or more product attributes are identified based on a plurality of known substitute pairs of a first subset of products of the group of products; and
      each of the known substitute pairs comprises a first product and a second product that is a substitute for the first product;
   identifying, by the processor, based on the one or more product attributes, one or more additional substitute pairs wherein at least one of the first product or the second product of each of the additional substitute pairs is from a second subset of group of products; and
   storing, by the processor, in a non-transitory computer memory, indications of the additional substitute pairs in an electronic record of product substitutes.

2. The method of claim 1, wherein the indications are first indications, and further comprising:
   presenting, by the processor, information indicative of a plurality of products of the group of products to a user;
   receiving, by the processor via a user input, a plurality of inputs each indicative of the first product and the second product being a substitute pair, wherein each of the plurality of inputs defines one of the plurality of known substitute pairs; and
   storing, by the processor, in the non-transitory computer memory, second indications of the known substitute pairs in the electronic record of product substitutes.

3. The method of claim 2, where the information indicative of a plurality of products presented to the user comprises products having sales volumes that are higher than sales volumes of other products in the group of products.

4. The method of claim 2, where the information indicative of a plurality of products presented to the user comprises products having more product attributes than other products in the group of products.

5. The method of claim 1, where each of the additional substitute pairs comprises a first product and at least two second products that are a substitute for the first product, such that each of the additional substitute pairs comprises a group of substitutes.

6. The method of claim 1, wherein the plurality of known substitute pairs are a subset of a larger grouping of substitute pairs, and wherein the identifying the one or more product attributes further comprises:
   selecting the known substitute pairs from the larger grouping of substitute pairs based on:
      the known substitute pairs having more known product attributes than the substitute pairs of the larger grouping not selected; or
      the known substitute pairs having higher sales volumes than the substitute pairs of the larger grouping not selected.

7. The method of claim 1, wherein the product attributes are hierarchically organized into levels, and further wherein the identifying of the one or more product attributes comprises identifying the hierarchical level of product attributes that are most likely to correspond to whether the product is the substitute for another product.

8. The method of claim 1, wherein the identifying the one or more product attributes further comprises:
   identifying the one or more product attributes that, if associated with each of two products, are most likely to indicate that the two products are a substitute pair.

9. The method of claim 8, wherein the identifying the one or more product attributes further comprises:
   developing a model, based on the one or more product attributes, indicative of which possible product pairs in the group of products are most likely to be substitute pairs.

10. The method of claim 9, wherein the one or more attributes comprise sales data that includes at least one of seasonal sales volume, weekend to weekday sales ratio, or sales frequency.

11. The method of claim 10, further comprising:
    applying the model to the group of products to generate automated indications of which of the group of products are substitute pairs;
    comparing the automated indications to manually defined product pair inputs to identify errors in the automated indications; and
    modifying the model upon identifying the errors.

12. The method of claim 11, wherein modifying the model comprises eliminating from the model one or more of the identified product attributes.

13. The method of claim 10, further comprising:
    varying the model to generate one or more modified models; and
    performing f-test comparisons of the model and the one or more modified models relative to manually defined product pair inputs to identify one of the model or the one or more modified models that most closely corresponds to the manually defined product pair inputs when applied to the group of products.

14. The method of claim 1, wherein the identifying the one or more product attributes further comprises:
    identifying the one or more product attributes that, if not associated with each of two products, are most likely to indicate that the two products are not a substitute pair.

15. The method of claim 1, where the group of products is determined based on products that have a majority of all of the product attributes in a larger group of products.

16. A system comprising:
    a memory configured to store data indicative of a plurality of product attributes associated with a group of products; and
    a processor coupled to the memory, the processor configured to:

identify one or more product attributes of the plurality of product attributes that are most likely to correspond to whether a product is a substitute for another product, wherein:
  the one or more product attributes are identified based on a plurality of known substitute pairs of a first subset of products of the group of products; and
  each of the known substitute pairs comprises a first product and a second product that is a substitute for the first product;
identify, based on the one or more product attributes, one or more additional substitute pairs wherein at least one of the first product or the second product of each of the additional substitute pairs is from a second subset of group of products; and
store, in the memory, indications of the additional substitute pairs in an electronic record of product substitutes.

17. The system of claim 16, wherein the processor is further configured to:
present information indicative of a plurality of products of the group of products to a user;
receive, via a user input, a plurality of inputs each indicative of the first product and the second product being a substitute pair, wherein each of the plurality of inputs defines one of the plurality of known substitute pairs; and
store, in the memory, second indications of the known substitute pairs in the electronic record of product substitutes.

18. The method of claim 16, where each of the additional substitute pairs comprises a first product and at least two second products that are a substitute for the first product, such that each of the additional substitute pairs comprises a group of substitutes.

19. A computerized method of identifying substitute pairs in a group of products, each product associated with product attributes, the method comprising:
presenting, by a processor, information indicative of a plurality of products of the group of products to a user;
receiving, by the processor via a user input, a plurality of inputs each indicative of a first product and a second product being a substitute pair, wherein each of the plurality of inputs defines one of a plurality of known substitute pairs;
storing, by the processor, in a non-transitory computer memory, first indications of the known substitute pairs in an electronic record of product substitutes;
identifying, by a processor, one or more product attributes of a plurality of product attributes that are most likely to correspond to whether a product is a substitute for another product, wherein:
  the one or more product attributes are identified based on the plurality of known substitute pairs of a first subset of products of the group of products; and
  each of the known substitute pairs comprises the first product and the second product that is a substitute for the first product;
identifying, by the processor, based on the one or more product attributes, one or more additional substitute pairs wherein at least one of the first product or the second product of each of the additional substitute pairs is from a second subset of group of products; and
storing, by the processor, in a non-transitory computer memory, second indications of the additional substitute pairs in the electronic record of product substitutes.

20. The method of claim 19, where each of the additional substitute pairs comprises a first product and at least two second products that are a substitute for the first product, such that each of the additional substitute pairs comprises a group of substitutes.

* * * * *